United States Patent [19]

Petrovsky

[11] Patent Number: 4,793,197

[45] Date of Patent: Dec. 27, 1988

[54] TELESCOPING DEVICE

[75] Inventor: Peter Petrovsky, Konstanz, Fed. Rep. of Germany

[73] Assignee: Dornier GmbH, Friedrichshafen, Fed. Rep. of Germany

[21] Appl. No.: 88,865

[22] Filed: Aug. 24, 1987

[30] Foreign Application Priority Data

Sep. 10, 1986 [DE] Fed. Rep. of Germany ....... 3630746

[51] Int. Cl.$^4$ .......................... F16H 25/24; F16B 7/10
[52] U.S. Cl. ............................... 74/89.15; 74/424.8 R; 248/161; 403/109
[58] Field of Search ....................... 74/424.8 R, 89.15; 248/188.5, 161; 403/109

[56] References Cited

U.S. PATENT DOCUMENTS

| 4,062,156 | 12/1977 | Roth | 52/111 |
| 4,651,581 | 3/1987 | Svensson | 74/89.15 |

FOREIGN PATENT DOCUMENTS

| 192094 | 8/1986 | European Pat. Off. | 403/109 |
| 2603488 | 8/1977 | Fed. Rep. of Germany . | |
| 3116770 | 11/1982 | Fed. Rep. of Germany . | |
| 1221419 | 3/1986 | U.S.S.R. | 74/89.15 |
| WO84/04371 | 11/1984 | World Int. Prop. O. | 74/89.15 |

Primary Examiner—Allan D. Herrmann
Attorney, Agent, or Firm—Ralf H. Siegemund

[57] ABSTRACT

In a telescopic arrangement wherein a plurality of telescoped tubes are provided for retraction and protraction; the tubes each include a nut element, said nut element being axially aligned, and means for causing one tube to engage respective outer one, the combination of a first main drive and working spindle onto which the nut elements are threaded to cause protraction and retraction of the respective tube, the nut elements disengaging one by one from the thread of the spindle as the respective next tube is caused to protract and its nut travels on the first spindle; a second nut retention spindle onto which the nuts of those tubes are threaded which are not yet to be extended or which have been retracted; there is a threadfree space between the two spindles to be traversed by that one of the nuts next to be threaded onto the first spindle and prior to that one of the nuts that travels on the first spindle leaving that first spindle; the two spindles are driven in unison but at a particular ratio so that a nut on the first spindle travels essentially for the length of the first spindle while the nut on the second spindle moves only for a short distance.

5 Claims, 2 Drawing Sheets

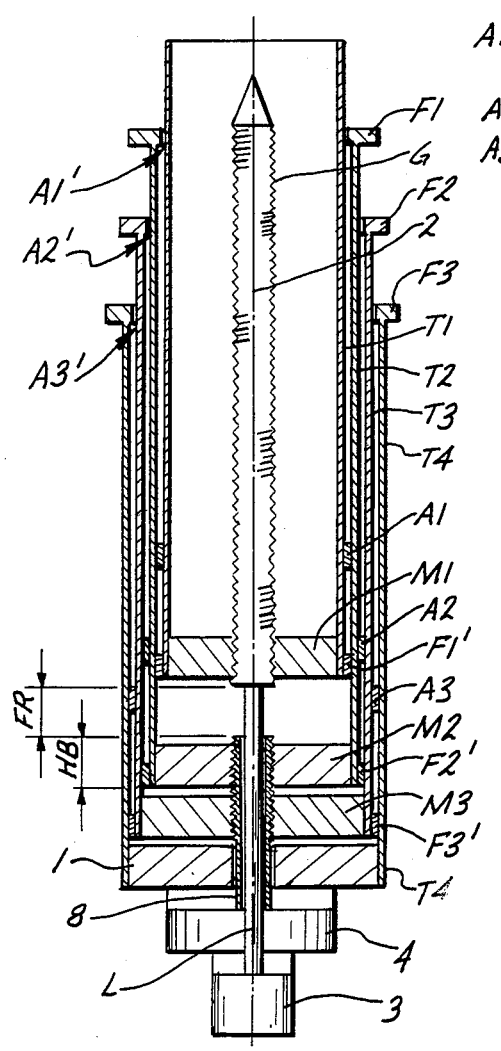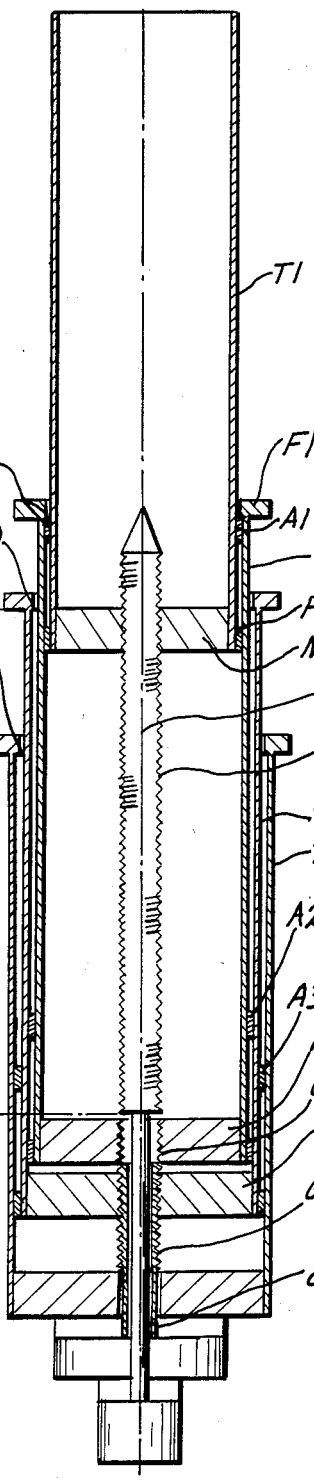

TELESCOPING DEVICE

BACKGROUND OF THE INVENTION

The present invention relates to a retention device for elements being part of and within a telescopically linked variable length device including the drive means for advancing and retracting these telescoping elements and cooperating with a spindle drive with nut elements traveling thereon as the spindle rotates, further including structure for positively connecting the elements in relation to each other upon deployment and extension.

Devices of the type to which the invention pertains include structures shown for example in German patent No. 26 03 488 and German printed patent application No. 31 16 770. Devices of the type generally to which the invention pertains exhibit a danger that upon protraction and deployment of the telescopic arrangement, friction establishes lateral loads on the telescoped element or elements so that as a result certain premature extension movement obtains even though a specific extension should not occur until adjacent elements have reached their maximum deployment tension. In other words, normal operation requires that one element after the other is caused to protract and the respective next one should begin to protract only after the respective preceding one has attained fully extended position. In the case of such premature extension the danger exists that friction interferes with the regular sequencing of deployment. In order to avoid this drawback it has been suggested to provide a spindle drive with an axial extension such that a nut of a telescopic element is always engaged and the telescopic elements have abutments in conjunction with a latching equipment to provide positive coupling in a predetermined sequence. This is basically shown in the German patent mentioned earlier, 26 03 488.

Another device has been proposed where latching and locking between elements obtains under utilization of mutual latch operation and coupling to enforce a particular sequence and a dependency upon relative positioning of the elements in relation to each other. This approach is shown in German printed patent application No. 31 16 770. Another possibility exists for retaining elements of a telescopic unit by providing bores in these elements to cooperate with pin locks.

DESCRIPTION OF THE INVENTION

It is an object of the present invention to improve devices of the type mentioned in the introduction and to provide a deployment latching for telescopic, length extendable tubes such as telescopic masts for antennas or the like and wherein an improvement obtains as compared with the known structure under reduction of the number of elements employed and under simplification of an overall construction avoiding the drawbacks complexities outlined above.

It is another object of the present invention to improve deployment and retraction of telescoping structures having nested tubular elements with nuts at one end for spindle drive operation; moreover the tubes can engage in that any one moves another that is coupled to the former.

In accordance with the preferred embodiment of the invention, it is suggested to provide two spindles, coaxially or side by side, with a threadfree space between them. A nut element will slowly advance on one spindle and fast on the other. Hence, telescoping tubes not yet to be deployed are nonetheless advanced slowly but held by and on this supplemental retention spindle while at a time one tube, through its nut, is moved fast as its nut travels on the other, the main drive or working spindle. The spindles are of course driven in unison but transmission ratios and/or relevant pitches are such that speed and path differentials obtain. Thus, a tube is extended as its nut is driven by and travels on the main working spindle, almost to the end thereof, but prior to reaching the end that tube is somehow (conveniently) coupled to the next one. The nut of the latter had slowly advanced on and to the end of the retention spindle, and now, as the first tube continues as its nut travels the rest of the way on the main drive spindle, the nut of the coupled one next tube traverses the threadfree space and is threaded onto the main drive spindle advancing thereon as the first mentioned nut leaves that spindle etc. and so forth.

The construction in accordance with the preferred embodiment of the present invention does not require any control with elements designed specifically for retaining or releasing telescoping elements. What is happening can be described simply as follows: the telescoping tubes through their nuts travel and are advanced slowly on the retention spindle and the main drive spindle takes over when a nut has traversed the threadfree space from one spindle to the other on account of telescoping tube intercoupling. The locking or latching of tubes to each other is provided within the telescoping device affording protection against external interference. The latching and locking moreover is independent from tolerances of the telescoping element and there are no additional elements necessary. The same is true on account of the double spindle guiding and moving provided for the telescoping tubing.

The embodiment with a central or coaxial arrangement of the two spindles will be required to take up only limited loads. The additionally required second retention spindle has the same thread as the main drive working spindle, the requisite gear being required to transmit only low power at low numbers of revolution. In the case of an axis parallel arrangement of the two spindles the drive of the telescopic elements can be made independent from the spindle threading either through a transmission in the drive as it affects the retention spindle or through appropriate thread transmission gear configuration.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a length variable device shown in longitudinal section but in a somewhat schematic illustration of a first example of the preferred embodiment of the present invention for practicing the best mode thereof; the device being shown with telescoping elements being at rest or retracted;

FIG. 2 shows a device in accordance with FIG. 1 but with a position of deployment.

Figure 3:
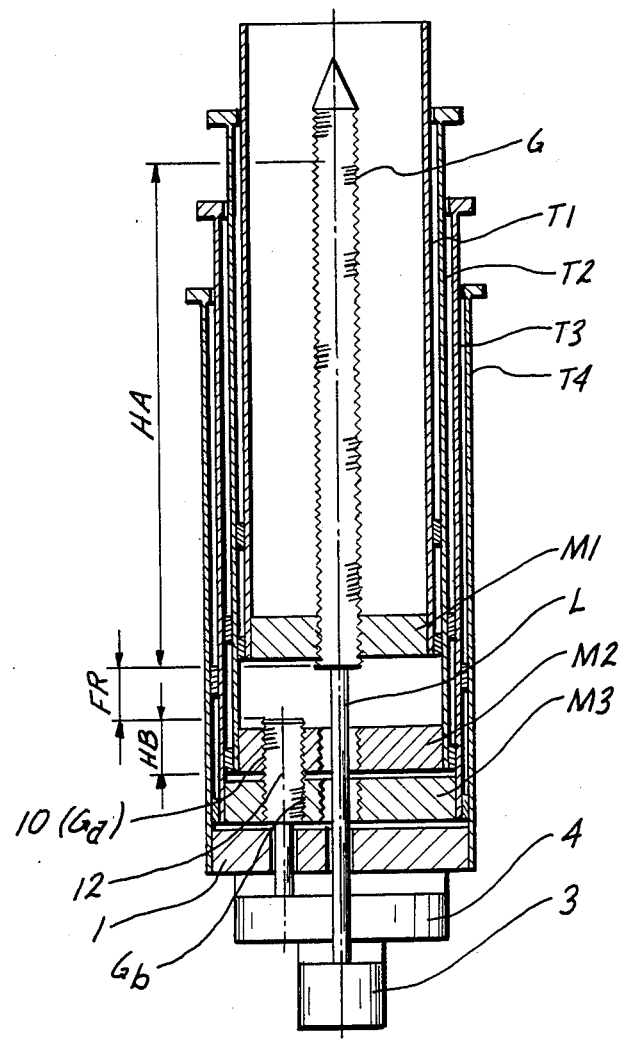
FIG. 3 illustrates another example of the preferred embodiment concerning modification as far as latching is concerned as compared with FIGS. 1 and 2.

Proceeding now to the detailed description of the drawings the device shown in FIGS. 1 and 2 is comprised of several concentric and telescopically nested and positioned tubular elements $T_1$, $T_2$ and $T_3$ each having at the respective lower end a nut element $M_1$, $M_2$, $M_3$ respectively. In addition a threaded spindle 2 is provided traversing coaxially directly all tubes including immediately the innermost tube $T_1$. A drive being comprised of a drive motor 3 acts on the spindle 2 but not directly because in addition there is a transmission gear 4 interposed between the motor 3 and the spindle 2.

A telescopic element $T_4$ is constructed as guide and carrier part and has at its lower end a flange 1; this element $T_4$ is stationary. The threaded spindle 2 has a certain thread section G and a lower, threadfree section L having a diameter that is smaller than the bore diameter of the thread $G''$ of any of the nuts being specifically provided for threadedly engaging and riding on the thread G of spindle 2.

In the illustrated example the length of the threaded working spindle 2 and here of the threaded portion of that spindle corresponds approximately to the length of the telescoping elements $T_1$ etc.. Each of the telescoping elements $T_1$ etc. has a guide element adjacent to the respective other element, these guides being denoted respectively by reference numerals $F_1$, $F_2$, $F_3$. They are provided for mutual support as well as for deployment and retraction of the telescoping elements $T_1$, $T_2$, $T_3$. In addition the end and most deployed positions find these elements in a load supporting disposition.

In addition, abutments are provided $A_1$, $A_2$, $A_3$ as well as $A_1'$, $A_2'$, $A_3'$ respectively at the adjacent telescope elements $T_1$, $T_2$ and $T_3$ in order to provide for positive coupling between them particularly during deployment as well as retraction. Specifically, $A_1'$, $A_2'$ and $A_3'$ are stops pertaining to guides $F_1$, $F_2$, $F_3$ at the upper end of tubes $T_2$, $T_3$ and $T_4$. The counter stops $A_1$, $A_2$, $A_3$ are on near but spaced from the lower end of tubes $T_1$, $T_2$ and $T_3$ respectively. The lower ends proper of the tubes are provided respectively with guides $F_1'$, $F_2'$, $F_3'$.

The spindle has as stated a threadfree portion L on which is mounted a retention spindle 8. That spindle 8 is freely rotatable vis-a-vis the spindle 2 but prevented from axial displacement thereon. Thread $G'$ of the spindle 8 is of the same configuration as the thread G of spindle 2 in terms of guide spacing etc.. The retention spindle 8 is, moreover, drivable by means of the gear 4 independently from spindle 2.

A spacing FR is provided and maintained between the thread G of spindle 2 on one hand and the thread $G'$ of the retention spindle 8 on the other hand. The spacing has an axial extension that is larger than the axial length or height H-B of any of the nuts $M_1$ etc.. The diameter of the bearing and support portion L of the spindle 2 in the area of this gap and spacing F-R has to be smaller than the bore diameter of the thread $G''$ of any of the nuts $M_1$ etc..

The device as described thus far functions and operates as follows.

The telescopically arranged, longitudinally and length extensible device works basically in accordance with the known principle according to which any of the telescoping elements can be protracted and retracted by means of the spindle 2 having a length extension which corresponds approximately to the length extension of that element. The various telescoping elements are $T_1$ etc. are interconnectable by means of abutment $A_1$ and $A_1'$. They can be taken out of a completely nested telescopically retracted position by engagement of the respective nuts with the spindle drive G. In the fully deployed, terminal position of the respective outer telescopic element $T_3$ its nut part $M_3$ remains in engagement with the threading G of the spindle 2. Analogously (see FIG. 1) in the fully retracted portion of all telescopic tubes the innermost one $T_1$ has its nut $M_1$ remain in engagement with threading gear G of spindle 2. A nut element $M_1$ and/or $M_2$ during extension and upon being driven by the spindle 2 will disengage from the spindle 2 only after the particular nut ($M_2$ or $M_3$) of the adjacent telescoping element positively engages the threading G of the spindle 2. Now as far as the deployment process is concerned (transition from FIG. 1 to FIG. 2), as the drive rotates the spindle 2 the nut part $M_1$ rotates up in the direction towards the free end of the spindle 2. Before the nut part $M_1$ of the element $T_1$ disengages spindle 2 (FIG. 2) the telescoping element $T_2$ is axially coupled to the telescoping element $T_1$ through mutual engagement of abutment stops $A_1$ and $A_1'$ (FIG. 2) so that now the two elements $T_1$ and $T_2$ are moved together as spindle 2 continues to rotate. Accordingly, the nut element $M_2$ with its thread $G''$ will engage the lower end of spindle gear and threading G. Hence for a short period of time the thread $G''$ of $M_1$ pertaining to telescoping element $T_1$ on one hand and the thread $G''$ of $M_2$ of element $T_2$ or on the other hand are both in engagement with the thread G of spindle 2. As the protraction continues thread $G''$ of $M_1$ disengages from the spindle thread G while thread $G''$ of $M_2$ remains in engagement therewith as it and tube $T_2$ ride up on the spindle.

However, $T_1$ remains coupled to $T_2$ and is therefore moved therewith by latching $T_1$ and $T_2$ together. In order to latch and mutually secure the protective position of elements $T_1$ and $T_2$, and $T_2$ and $T_3$ one uses locks and latches of known construction and which are omitted here and no particular claim is made for them. Reference is made specifically to the above mentioned patent publications.

The procedure as described above with reference to elements $T_1$ and $T_2$ continues until $M_2$ and $M_3$ simultaneously engage the spindle 2; the $M_2$ disengages tubes $T_2$ and $T_3$ are latched together and $M_3$ rides the assembly $T_1$, $T_2$ and $T_3$ up until all of the tube elements $T_1$, $T_2$ and $T_3$ are deployed whereby in the completely protracted position the nut element M3 of telescoping element T3 which was protracted last remains with its thread $G''$ in engagement with thread G of spindle 2 so that this particular engaging position is a starting position from which retraction can proceed. The retraction is simply obtained through reversal of the rotation of the spindle 2 which in turn is obtained through reversal of the drive motor 3.

In accordance with the specific aspects of the invention the retention spindle works as follows. In the retracted position the nut $M_1$ of telescopic element $T_1$ engages thread G of spindle 2 while the other nuts, $M_2$ and $M_3$ engage the thread $G'$ of the retention spindle 8. The retention spindle 8 in this particular example has the same dimensions as to the thread as the spindle 2. As spindle 2 is driven so is the retention spindle 8 through the reduction gear 4 both being driven by motor 3. A transmission ratio obtains as far as the numbers of revolution of the spindle 2 and 8 are concerned, as follows. RPM of spindle 2 over RPM of spindle 8 equals the thread section HA of spindle 2 over thread section HB of nut M1 2 or 3. In this case spindle 8 moves simultaneously but at a lower speed as compared with spindle 2. This relation states broadly the principles involved as the nut of an extending telescopic element traversed path HA, the nut of the next element moves a small distance HD or the retention spindle. These relations obtain through fluid and/or speed and transmission ratio etc. selection.

Thus as nut $M_1$ rides upon the spindle 2, the two nuts $M_2$ and $M_3$ of the elements $T_2$ and $T_3$ respectively are axially moved with $M_2$ entering the threadfree space FR (compare FIGS. 1 and 2). The transmission ratio effective between the numbers of revolution of the two spindles 2 and 8 causes, as is shown, the following. As nut $M_1$ has reached the position "$HA_{max}$" shown in FIG. 2 and as soon as the stop $A_1$ of element $T_1$ abuts stop $A_1'$ of element $T_2$, the nut $M_2$ disengages thread $G'$ of retention spindle 8 and is now situated in the threadfree space FR between the thread G of spindle 2 and the thread $G'$ of spindle 8. This means that the element $T_2$ is for a short period of time driven neither by spindle 2 nor by spindle 8.

From this position forward, nut $M_2$ with its thread $G''$ will upon further movement of the spindles and owing to abutment of stops $A_1$ and $A_1'$; be moved out of the space FR and into engagement with the thread G of spindle 2. As soon as nut $M_2$ assumes the position $HA_{max}$ the next nut namely $M_3$ disengages from the thread $G'$ of retention spindle 8 so that as the extension and spindle rotation continues as was mentioned above and through abutment of $A_2$ and $A_2'$ the nut $M_3$ will necessarily be moved out of the free space FR and into engagement with the thread G of spindle 2.

The retraction obtains just by reversal of spindle 2 i.e. of the drive motor 3 and the sequence is run through in the reverse order as described. Also it can be seen that the number of telescopic elements (here three) is quite arbitrary and certainly not limited to a three element configuration as illustrated. The nuts M1 etc. are as shown prevented against rotation about their longitudinal axis in convenient and suitable fashion.

The example shown in FIG. 3 has its retention spindle provided differently in that particularly the retention spindle 12 as compared with FIGS. 1 and 2 has its axis displaced in parallel. The nut parts $M_1$ etc. are provided with additional bores such as 10 having a thread Ga whereby the axes of the bores 10 of the nuts $M_1$ etc. are disposed coaxial to each other and extend parallel to the longitudinal axis of the spindle 2. The corresponding thread Gb of retention spindle 12 engages the respective thread Ga of any of the nuts $M_1$ etc..

The drive of the retention spindle 12 causes the nuts $M_2$ and $M_3$ to be forced towards the spindle 2 and the threadfree space FR. These nuts are thus under control and particularly prevented from an undesirable axial movement such as protraction during the controlled protraction as provided by nut $M_1$ causing telescopic element $T_1$ to protract. The other two elements $T_2$ and $T_3$ are positively prevented from the extension until the extension of element $T_1$ has been completed. Here then, after a particular path has been traversed, telescopic element $T_2$ with its nut $M_2$ and thread Ga disengages threadedly from the thread Gb of retention spindle 12 and is now in the free space FA between nut thread Ga and retention spindle thread Gb.

As the telescopic elements $T_1$ and $T_2$ are interconnected through abutments and latching of $A_1$ and $A_1'$ telescopic element $T_2$ follows through this coupling and that causes threading of the gear $G''$ of nut $M_2$ to be threaded upon the gear thread G of spindle 2. The elements $T_1$ or $T_2$ will be transported in the same fashion as described above with reference to FIGS. 1 and 2.

The spindle 12 is, in the given example, driven vis-a-vis the spindle 2 at a reduced speed. However, it is conceivable that the thread Gb of retention spindle 12 and correspondingly the thread Ga of the various nuts $M_1$ have smaller pitch as the thread G of the spindle 2. This way one obtains a reduction of the adjusting motion of the nuts $M_1$ on the retention spindle 12 as compared with the adjustment the nuts $M_1$ etc. under go on spindle 2.

The invention is not limited to the embodiments as described above but all changes and modifications thereof, not constituting departures from the spirit and scope of the invention, are intended to be included.

I claim:

1. In a telescopic arrangement wherein a plurality of telescoped tubes are provided for retraction and protraction; the tubes each include a nut element, said nut element being axially aligned, and means for causing one tube to engage respective outer one, the combination comprising:

a first main drive and working spindle onto which said nut elements are threaded to cause protraction and retraction of the respective tube, the nut elements disengaging, one by one, from the thread of the spindle as the respective next tube is caused to protract and its nut travels on the first spindle;

a second, nut retention spindle onto which nuts of those tubes are threaded which are not yet to be extended or which have been retracted;

means defining a threadfree space between the first and second spindle to be traversed by that one of the nuts next to be threaded onto the first spindle and prior to that one of the nuts that travels on the first spindle leaving that first spindle; and means for driving the first and second spindles in unison so that a nut on the first spindle travels essentially for the length of the first spindle while the nut on the second spindle moves only for a short distance.

2. The combination as in claim 1 wherein the spindles have similar pitch, there being transmission means such that the first spindle rotates faster than the second spindle.

3. The combination as in claim 1, the two spindles being coaxially arranged.

4. The combination as in claim 1 wherein each nut has two threaded bores respectively for receiving the spindles being parallel to each other.

5. The combination as in claim 4, the spindles and threads having different pitch.

* * * * *